(12) United States Patent
Masfaraud et al.

(10) Patent No.: US 7,999,497 B2
(45) Date of Patent: Aug. 16, 2011

(54) DEVICE FOR CONTROLLING POLYPHASE ROTATING MACHINE

(75) Inventors: Julien Masfaraud, Paris (FR); Hugues Doffin, Creteil (FR); Farouk Boudjemai, Marcoussis (FR)

(73) Assignee: Valeo Equipements Electriques Moteur, Creteil (FR)

( * ) Notice: Subject to any disclaimer, the term of this patent is extended or adjusted under 35 U.S.C. 154(b) by 521 days.

(21) Appl. No.: 12/160,330

(22) PCT Filed: Jan. 17, 2007

(86) PCT No.: PCT/FR2007/050659
§ 371 (c)(1),
(2), (4) Date: Jul. 23, 2008

(87) PCT Pub. No.: WO2007/083062
PCT Pub. Date: Jul. 26, 2007

(65) Prior Publication Data
US 2010/0225257 A1    Sep. 9, 2010

(30) Foreign Application Priority Data
Jan. 20, 2006 (FR) ...................... 06 00533

(51) Int. Cl.
*H02P 21/00* (2006.01)

(52) U.S. Cl. ......... 318/400.02; 318/400.01; 318/400.04; 318/722; 318/729; 318/756

(58) Field of Classification Search ............. 318/400.02, 318/400.01, 400.04, 729, 809, 722
See application file for complete search history.

(56) References Cited

U.S. PATENT DOCUMENTS

| | | | |
|---|---|---|---|
| 3,999,108 A | 12/1976 | Tanikoshi | |
| 4,271,385 A | 6/1981 | Azusawa | |
| 4,888,533 A * | 12/1989 | Gotoh et al. | 318/524 |
| 5,182,500 A * | 1/1993 | Shimada | 318/400.04 |
| 5,838,123 A | 11/1998 | Zhao | |
| 6,002,234 A | 12/1999 | Ohm et al. | |
| 6,388,405 B2 * | 5/2002 | Laurent | 318/400.09 |
| 6,512,341 B2 * | 1/2003 | Matsushiro et al. | 318/400.07 |
| 6,954,042 B2 * | 10/2005 | Lee et al. | 318/400.38 |

* cited by examiner

*Primary Examiner* — Walter Benson
*Assistant Examiner* — David S Luo
(74) *Attorney, Agent, or Firm* — Berenato & White, LLC

(57) ABSTRACT

A device for controlling a polyphase rotating machine comprising a stator, a rotor, and sensors, the device being capable of receiving at least one first sensing signal (V, W, U) representing a position of the rotor relative to the stator and outputted from a first sensor (16; 18; 14), and a second sensing signal representing the position and phase-shifted relative to the first signal (V, W, U). The second signal is outputted from a second sensor. The control device comprises: means (K, R) for combining the first and the second sensing signals (U, V, W) into a combined signal (Ku; Kv; Kw) including at least one controlled switching signal with a variable cyclic ratio. The combined signal (Ku; Kv; Kw) is based on the cyclic ratio and enables the machine to be controlled.

19 Claims, 2 Drawing Sheets

DEVICE FOR CONTROLLING POLYPHASE ROTATING MACHINE

CROSS-REFERENCE TO RELATED APPLICATIONS AND CLAIM TO PRIORITY

This application relates to International Application No. PCT/FR2007/050659 filed Jan. 17, 2007 and French Patent Application No. 0600533 filed Jan. 20, 2006, of which the disclosures are incorporated herein by reference and to which priority is claimed.

FIELD OF THE INVENTION

The invention concerns a device for controlling a polyphase rotary electrical machine, possibly reversible as in the case of alternator starters.

PRIOR ART

A rotary electrical machine conventionally comprises a rotor and a stator. One of these elements has a direct current passing through it and thus generates a constant magnetic field of fixed orientation with respect to this element. The other element comprises a plurality of distinct windings angularly spaced apart; each winding has passing through it a current offset in phase with respect to that of the other windings so as to create a rotating magnetic field. The coexistence of the fixed-orientation field of the first element and the rotating field of the second element causes the rotation of theses elements with respect to each other, that is to say the rotation of the rotor with respect to the stator.

The various currents are generally injected into the windings of the polyphase element through a bridge formed by power switches (in general diodes associated with power transistors).

This power bridge is in general controlled by an electronic module that fixes the moments of opening and closing of the switches and thus controls the phase of the various currents through the windings.

In order to determine the control times for the switches, the electronic module normally uses switches representing the position of the rotor with respect to the stator, such as for example position sensors regularly distributed over the circumference of the rotary machine, the said sensors each sending for example periodic signals depending on the frequency of rotation of the rotor and offset in phase with respect to one another.

In the case where the rotary electrical machine is reversible, the power bridge fulfils the role of a bridge rectifier during the functioning of the machine in alternator mode.

For the purpose of approaching optimum torque over a large range of rotation speeds, the document WO 2004/100351 proposes to process the signals issuing from the sensors by weighting and adding, in practice by means of an analogue filtering circuit composed of capacitors and resistors, which makes it possible to produce phase differences continuously variable over the entire range or rotation speeds.

However, according to this solution, the phase offset is determined according to the speed by the components of the analogue circuit. The offset/speed relationship is therefore fixed and can therefore in particular not be adapted to the different situations that may be encountered (starting, dynamic assistance, etc.). In addition, the choice of this relationship lacks flexibility since it is determined according to the circuit elements used and is therefore not very adaptable to other electrical machines, for example with different sizes.

This design also involves the use of an analogue circuit with characteristics particular to each type of machine that it is wished to manufacture, which complicates the manufacture of the machines on an industrial level.

OBJECT OF THE INVENTION

To avoid these problems and thus afford in particular greater flexibility in the phase offset of the signals issuing from the sensors, the invention proposes a device for controlling a polyphase rotary electrical machine, the said machine comprising a stator, a rotor and sensors, the said device being able to receive:
  at least a first sensor signal representing a position of the rotor with respect of the stator and delivered by a first sensor, and
  a second sensor signal representing the said position and offset in phase with respect to the first signal, the said second signal being delivered by a second sensor.
According to the invention, the control device comprises:
  means for combining the first and second sensor signals in a combined signal, the said means comprising at least one switching element controlled with a variable duty cycle ratio, the combined signal being a function of the duty cycle ratio and making it possible to control the said machine.

The phase offset of the combined signal is thus determined by the duty cycle ratio of the switching means, which makes it possible to control this offset flexibly within a wide range.

According to non-limitative embodiments, the device according to the invention can comprise one or more of the following characteristics:

A low-pass filter can be introduced so as to filter the combined signal, which makes it possible to obtain a filtered signal with a conventional shape, in general sinusoidal.

The low-pass filter preferably has a cutoff frequency lower than the transmission frequency of the switching means; in this way the undesirable harmonics generated by the switching are eliminated from the filtered signal. The said cutoff frequency is for example between 1 kHz and 100 kHz, which makes it possible not to influence the useful frequencies below 1 kHz whilst switching the switching means at a reasonable frequency.

The combination means also comprise means of weighting the sensor signals. The weighting means can comprise at least one resistor intended to receive a sensor signal as an input.

In addition, the combination means comprise two switching elements intended to receive a sensor signal.

In a first embodiment a first switching element is intended to switch in the opposite direction to the second switching element.

In a second embodiment, a second switching element is intended to be controlled by means of a second duty cycle ratio.

In a practical embodiment where a third position sensor is used, the combination means are able to combine a third sensor signal with the first and second sensor signals.

In a first embodiment, a switching element is a simple switch.

In a second embodiment, a switching element is a two-position switch.

In addition, the device is able to receive as an input a number of sensor signals equal to the number of phases of the machine.

According to an embodiment envisaged, the control device cooperates with a control circuit of a power bridge, the said control circuit being able to receive the sensor signal.

According to one embodiment envisaged, the control device cooperates with a control circuit of a power bridge, the said control circuit being able to receive a filtered combined signal.

According to a practical embodiment, a control circuit comprises a microprocessor able to control the duty cycle ratio of the switching element.

In this case, it is also possible to provide for the microprocessor to be able to determine the duty cycle ratio according to an item of information representing the rotation speed of the machine, which makes it possible to control, by practical means, the offset of the sensor signals according to the rotation speed.

The invention also proposes a polyphase rotary electrical machine such as an alternator starter, which comprises a control circuit constructed as mentioned above.

BRIEF DESCRIPTION OF THE FIGURES

Other characteristics and advantages of the invention will emerge in the light of the following description given with reference to the accompanying drawings, in which.

DETAILED DESCRIPTION OF NON LIMITATIVE EMBODIMENTS OF THE INVENTION

Figure 1:
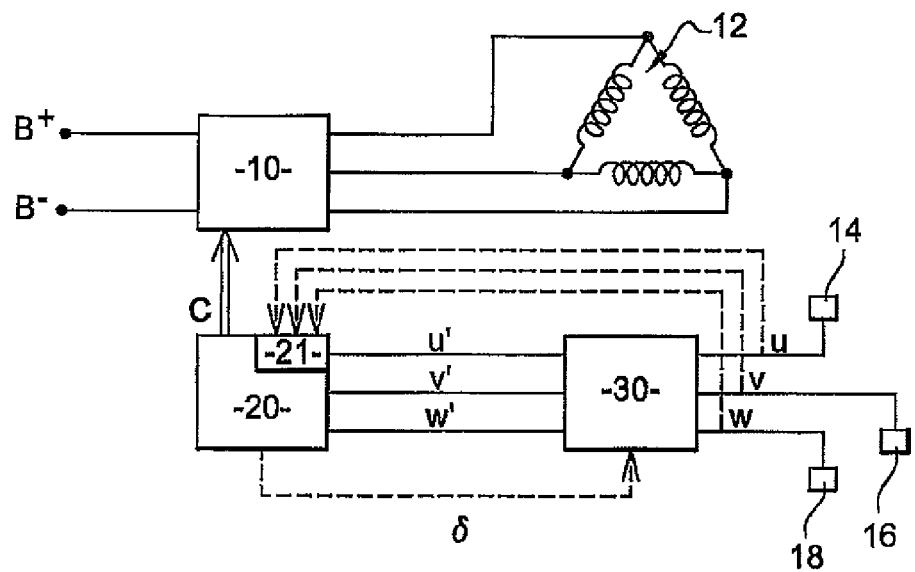
FIG. 1 depicts the elements of a polyphase rotary electrical machine and its control, the control comprising a phase lead unit.

FIG. 1 depicts the principal elements of a polyphase rotary electrical machine, for example reversible of the alternator starter type, as well as its control. FIG. 1 presents a non-limitative example of a three-phase rotary electrical machine with three position sensors.

Such a control comprises a power bridge 10 which, in rotor mode, supplies the phases of a stator 12, in this non-limitative example three phases, from a voltage generated between the two terminals $B^+$, $B^-$ of a supply battery.

The power bridge 10 is formed by switches (not shown) that are controlled by control signals C so that the various windings of the stator 12 have signals passing through them offset by 120° with respect to one another in this example.

In this non-limitative example, there are three sensors. The three linear sensors, 14, 16, 18 are non-limitatively equally distributed over 360° electrical and generate sensor signals U, V, W. These signals are processed by a control device called a phase-lead unit 30 that delivers three digital signals, U', V', W' corresponding to the sensor signals U, V, W with a phase lead δ with respect to these.

The numerical signals U', V', W', generated by the phase-lead unit 30 are used by a control circuit 20 to form the control signals C for the power bridge 10.

The control circuit 20 also generates a phase-lead value δ. To do this, the control circuit comprises for example a microcontroller (including a microprocessor) that determines the machine rotation speed on the basis of the sensor signals U, V, W or on the basis of the digital signals U', V', W' and that derives therefrom the phase offset δ to be used, possibly also a function of other conditions, such as the operating phase of the machine (for example motor mode, transition from motor mode to generator mode). In this non-limitative example, the offset value δ is therefore associated with a given operating speed and condition and is for example stored within the microcontroller in a look-up table. To this end, the control circuit comprises an input stage 21 able to receive the sensor signals U, V, W or the digital signals U', V', W'.

When the machine functions in alternator mode, also called generator mode, the power bridge 10 fulfils the role of a bridge rectifier that transmits energy from the machine (and in particular from the stator 12) to the battery (terminal $B^+$, $B^-$).

Figure 2:
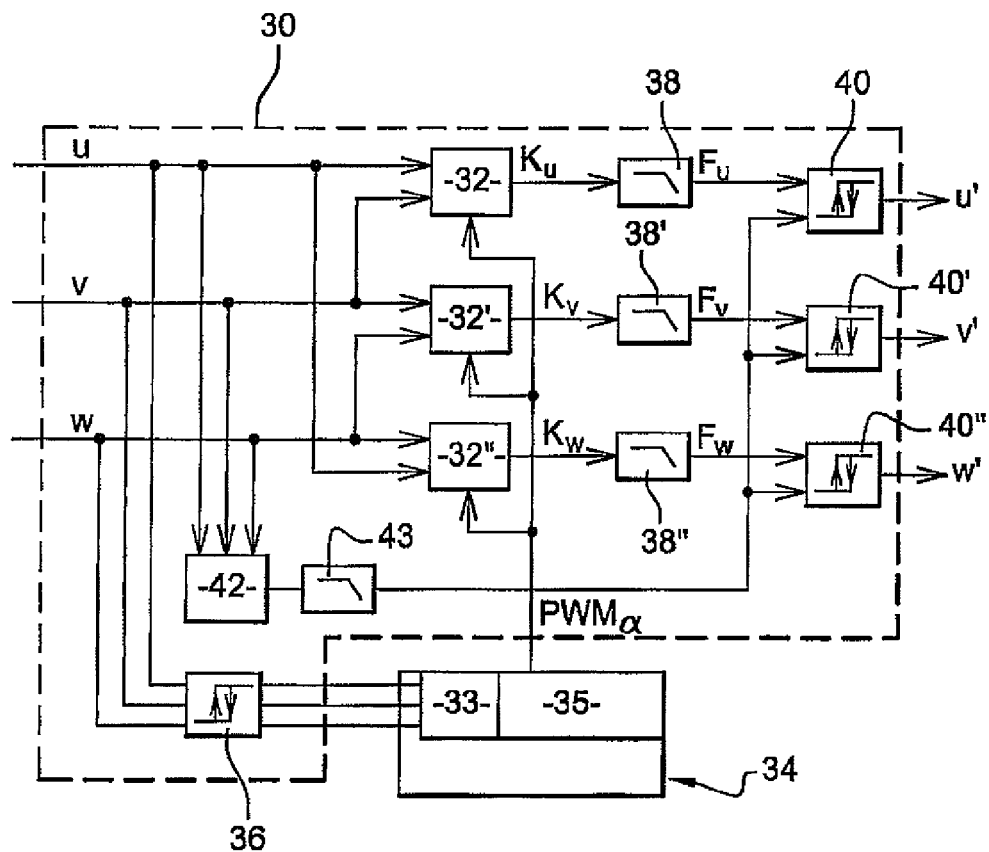
FIG. 2 depicts a non-limitative embodiment of the phase-lead unit of FIG. 1, the phase-lead unit comprising a mixing circuit.

FIG. 2 depicts a first non-limitative embodiment that can be envisaged for the phase lead unit 30.

In this embodiment, each sensor signal U, V, W issuing from a sensor 14, 16, 18 is applied to a first input of a so-called "mixing" circuit respectively 32, 32', 32", example embodiments of which will be given hereinafter.

Each mixing circuit 32, 32', 32" also receives at a second input another sensor signal V, W, U issuing from a sensor and having a phase lead of 120° with respect to the sensor signal U, V, W received at its first input.

Thus each mixing circuit 32, 32', 32" receives at its first input one of the sensor signals U, V, W and at its second input the sensor signal V, W, U in phase lead of 120° with respect to the one received at the first input.

Each mixing circuit 32, 32', 32" also receives a control signal $PWM_\alpha$ formed by pulses with a variable duty cycle ratio α, this control signal therefore being a pulse width modulation signal, also called PWM. The control signal $PWM_\alpha$ controls the switching of switching elements of the mixing circuits 32, 32', 32" as described below.

In the embodiment depicted in FIG. 2, the same control signal $PWM_\alpha$ is applied to all the three mixers 32, 32', 32". In a variant, it would naturally be possible to provide specific control signals for each mixing circuit.

In the embodiment depicted in FIG. 2, the control signal $PWM_\alpha$ is generated on a pin of a microprocessor 34, a part 35 of which is dedicated to the generation of this control signal $PWM_\alpha$ (part means here a part of the software that controls the microprocessor 34; in a variant, the implementation of the same function in hard-wide logic could be envisaged).

As can be seen in FIG. 2, the microprocessor 34 also receives the signals U, V, W issuing from the sensors 14, 16, 18 through a first hysteresis comparator 36 that converts them into two-state signals. The signals thus received are intended for a part 33 of the microprocessor 34 dedicated to determining the speed of the rotary machine as described above. In a variant, it is also possible to use the signals U', V', W' as described above in order to determine the speed as described above.

The rotation speed information thus determined is in particular used in the microprocessor 34 to determine the phase lead to be implemented by the phase-lead unit 30. From this phase lead, the microprocessor 34 determines the duty cycle ratio α of the signal $PWM_\alpha$ to be applied to the mixing circuit 32, 32', 32".

The relationship between the speed determined by the speed determination part 33 and the duty cycle ratio α (either directly or by means of the phase offset δ) is for example stored in a memory associated with the microprocessor 34 in the form of a look-up table.

The required phase offset δ (and consequently the duty cycle ratio α used) can naturally depend on parameters other than the rotation speed of the rotary machine, such as for example the operating mode of the rotary machine (for example motor mode (starting phase or high-speed dynamic assistance), transition from motor mode to generator mode) or torque value. In this case it is possible to provide several look-up tables as mentioned above, each table being used in a specific operating mode of the rotary machine.

As we will be seeing hereinafter in the light of the example embodiments of the mixing circuits 32, 32', 32", the latter form two different types of combination of the signals that they receive as an input when the control signal $PWM_\alpha$ is high level or low level. (Here where applicable combination means a combination in which one of the two signals has a zero weight, that is to say only the other signal is transmitted).

The alternation of the two types of combination (the result of which is the signals Ku, Kv, Kw) is emitted at the output of each mixing circuit 32, 32', 32" intended for a low-pass filter whose cutoff frequency is lower than the frequency of the control signal $PWM_\alpha$ (that is to say the alternation frequency of the two types of combination) so that the filtered signal at all times forms the average of the combinations of the two types, the said average being weighted by the duration of each of the combinations and naturally depending on the duty cycle ratio α of the control signal $PWM_\alpha$. Consequently the adjustment of the duty cycle ratio α makes it possible to obtain three output signals U', V', W', having a phase lead δ according to a phase lead value demanded. It should be noted that adjusting the duty cycle ratio and therefore having a variable duty cycle ratio makes it possible to obtain a fine resolution of the phase lead δ and therefore fine control of the machine.

The cutoff frequency of each low-pass filter 38, 38', 38" is however higher than the frequency of the signals U, V, W so as to smooth the chopped signal Ku, Kv, Kw by removing the discontinuities. In the light of the conventional rotation speeds of rotary machines and the frequency of the sensor signals resulting from this (typically between 0 and 600 Hz), a cutoff frequency of 10 kHz is for example used non-limitatively, which makes it possible to use for example also a frequency of 130 kHz for the control signal.

The filtered signal $F_u, F_v, F_w$ emitted by each low-pass filter 38, 38', 38" is therefore a combination of the sensor signals received at the input of the corresponding mixing circuits 32, 32', 32" in which the influence of each of the signals received at the input of the corresponding mixing circuits 32, 32', 32" depends on the duty cycle ratio of the control signal $PWM_\alpha$. In this way a signal is obtained whose phase is between the phases of the input signals and adjustable by modification of the duty cycle ratio α of the control signal $PWM_\alpha$.

The filtered signals $F_u, F_v, F_w$ are applied respectively to a first input of corresponding second hysteresis comparators 40, 40', 40", which each receive at a second input the average of the sensor signals U, V, W determined by an averaging circuit 42 and by a low-pass filter 43 of the same type as the low-pass filters 38, 38', 38" preciously mentioned. By virtue of the use of the hysteresis comparators 40, 40', 40", the voltage shifts, called offset voltage in English, generated in the filter 38, 38', 38" are dispensed with.

In a variant (not illustrated), the hysteresis comparators 40, 40', 40" can compare the filtered signals $F_u, F_v$ and $F_w$ in pairs. A hysteresis comparator at this moment receives at its second input a filtered signal different from the one that is applied to the first input instead of the average of the sensor signals. This allows a comparison between filtered signals that is more robust faced with parasitic interference since the amplitude between the said signals is greater than in the first variant.

In this way there is obtained as an output of the hysteresis comparators 40, 40', 40" two-state signals U', V', W' corresponding respectively to the input sensor signals U, V, W with a phase lead that depends on the duty cycle ratio α of the control signal $PWM_\alpha$.

Figure 3:
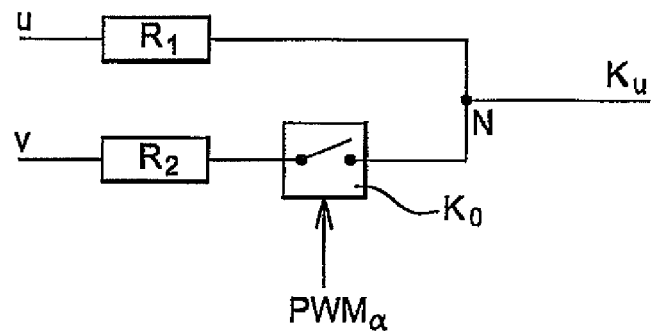
FIGS. 3 and 4 depict possible non-limitative embodiments of a mixing circuit of FIG. 2.

FIG. 3 depicts a first non-limitative example that can be envisaged for implementing each of the mixing circuits 32, 32', 32" described above. This example is written as implementation of the mixing circuit 32 (which receives as an input the signal U and the signal V in phase lead of 120° with respect to the signal U) but applies identically to the mixers 32', 32" by applying respectively as an input the signals V and W and the signals W and U.

In this example embodiment, the first signal (here the signal U) is applied, via a resistor R1, to a node N forming the output, while the second signal (here the signal V) is applied to this same node N through the series association of a resistor R2 and a switch K0 switched on command from the command signal $PWM_\alpha$.

There is thus obtained as an output (that is to say at the aforementioned node N) a signal $K_U$. The signal $K_U$ depends only on the sensor signal U during phases of the control signal $PWM_\alpha$ that forces the opening of the switch $K_0$ and depends both on the signals U and V (also weighted according to the resistors R1 and R2) during phases of the control signal $PWM_\alpha$ that cause the closure of the switch $K_0$. This solution therefore makes it possible to obtain, after low-pass filtering, a filtered signal $F_U$ that is equal to:

$$F_U = \frac{R2 + (1-\alpha)R1}{R1 + R2} U + \frac{\alpha R1}{R1 + R2} V$$

It can thus clearly be seen that there is obtained, for values of the duty cycle ratio α varying between 0 and 1, an output signal $F_u$ whose phase varies between that of the signal U itself (when α=0) and a phase close to that of the signal V (itself in phase lead of 120° with respect to the signal U) when α=1, by choosing appropriate values for R1 and R1 (the larger R1 is with respect to R2, the more the phase lead of $F_u$ approaches 120° for α=1).

Figure 4:
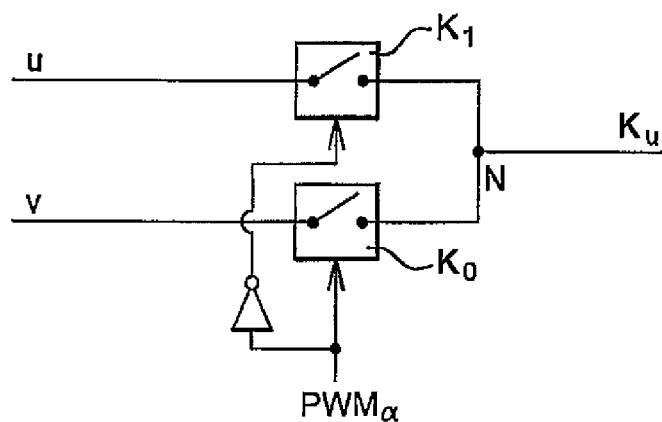

FIG. 4 depicts a second non-limitative example embodiment for the mixing circuits 32, 32', 32" of FIG. 2.

As before, the example described applies to the mixing circuit 32 but would apply identically to the mixing circuit 32' 32".

In this second example, the sensor signal U is transmitted, via a switch K1, to a node N forming an output, while the sensor signal V is transmitted, via a switch $K_0$, to the node N forming an output.

The switch K0 is switched according to the control signal $PWM_\alpha$ while the switch K1 receives the same control signal $PWM_\alpha$ through an inverter so that the switch K1 is switched opposite to the switch $K_0$.

In the phases where the control signal $PWM_\alpha$ causes the opening of the switch $K_0$, it thus causes the closure of the switch $K_1$ so that that the output signal $K_U$ (at the node N forming an output) depends only on the sensor signal U.

Conversely, when the control signal $PWM_\alpha$ causes the closure of the switch $K_0$, it also causes the opening of the switch $K_1$ so that the output signal $K_U$ depends only on the sensor signal V.

This solution makes it possible to obtain for the filtered signal $F_u$ the following value:

$$F_u = \alpha U + (1-\alpha)V$$

As before, by varying the duty cycle ratio α between 0 and 1, a phase lead of the signal $F_u$ with respect to the signal U is obtained that is variable between 0° (for α=0) and this time precisely 120° (for α=1).

Figure 5:
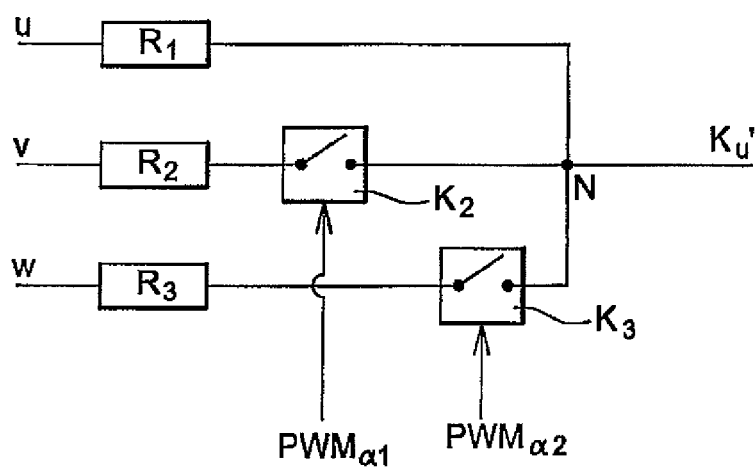
FIG. 5 depicts a variant embodiment of the mixing circuit.

FIG. 5 depicts a variant embodiment of a mixing circuit according to which the mixing circuit receives as an input the three sensor signals U, V, W.

The sensor signal U is transmitted, via a resistor R1, to a node N forming an output.

The sensor signal V (in phase lead of 120° with respect to the signal U) is transmitted, via the series association of a resistor R2 and a first switch K2 controlled by a first control signal $PWM_{\alpha 1}$ with a first duty cycle ratio $\alpha_1$, to the node N forming an output.

The sensor signal W for its part is transmitted to the node N forming an output via a series association of the same type, namely a resistor R3 and a second switch $K_3$ controlled by a second control signal $PWM_{\alpha 2}$ with a second duty cycle ratio α2.

There is therefore obtained, after low-pass filtering as described previously, a signal $F_{U'}$ that is written:

$$F_{U'} = \left[\frac{\alpha 1 + \frac{(\alpha 2 - \alpha 1)R2}{R1 + R2} + \frac{(1-\alpha 2)}{1 + \frac{R1}{R2} + \frac{R1}{R3}}}{}\right]U + \left[\frac{(\alpha 2 - \alpha 1)\frac{R1}{R1+R2} + \frac{(1-\alpha 2)}{\frac{R2}{R1} + 1 + \frac{R2}{R3}}}{}\right]V + \left[\frac{(1-\alpha 2)}{\frac{R3}{R1} + \frac{R3}{R2} + 1}\right]W$$

The lead of the phase output signal can thus vary between 0° and a value slightly less than 240° (by choosing resistance values for the resistors R1, R2, R3 that make the signal U on the output node N negligible when the switch $K_3$ is closed).

It should be noted that, in this variant and the previous embodiments in FIGS. 3 and 4, the switches are simple switches, namely they have a conducting state for transmitting a signal and an open state for stopping a signal transmission.

Figure 6:
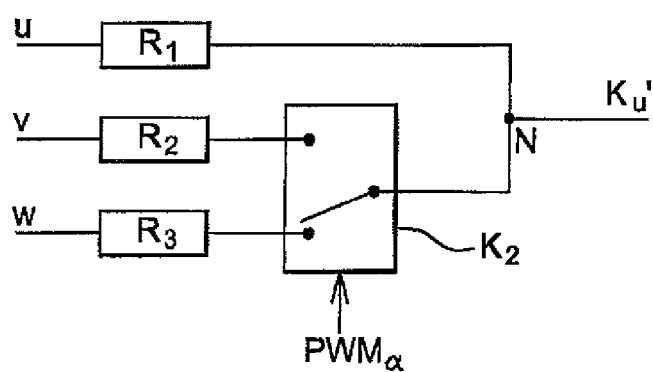
FIG. 6 depicts another variant embodiment of the mixing circuit of FIG. 2.

FIG. 6 depicts another variant embodiment of a mixing circuit according to which the mixing circuit receives as an input the three sensor signals U, V, W.

The sensor signal U is transmitted, via a resistor R1, to a node N forming an output.

The sensor signal V (in phase lead of 120° with respect to the signal U) is transmitted, via the series association of a resistor R2 and a switch $K_2$ controlled by a control signal PWMα, to the node N forming an output.

As for the sensor signal W, this is transmitted to the node N forming an output via a series association of the same type, namely a resistor R3 and the same controlled switch $K_2$ controlled by the same control signal $PWM_\alpha$.

There is therefore obtained, after low-pass filtering as described previously, a signal $F_u$ that is written:

$$F_{U'} = \left[\frac{\frac{\alpha R2}{R1+R2} + \frac{(1-\alpha)R3}{R1+R3}}{}\right]U + \left[\frac{\alpha R1}{R1+R2}\right]V + \left[\frac{(1-\alpha)R1}{R1+R3}\right]W$$

The lead of the phase output signal can thus vary between 0° and a value slightly less than 240° (by choosing resistance values for the resistors R1, R2, R3 that make the signal U on the output node N negligible when the switch $K_3$ is closed).

It should be noted that, in this variant, the controlled switch $K_2$ is two-position, namely it comprises at least two conducting states making it possible to selectively transmit one signal from several.

The above examples represent only possible implementations of the invention, which is not limited to these. For example, in the variant in FIG. 6, it is possible to imagine using the same control signal $PWM_\alpha$ or, in place of two switches $K_2$ and $K_3$, using a single switch with a resistor bridge.

The invention claimed is:

1. A control device (30) for controlling a polyphase rotary electrical machine, said machine comprising a stator, a rotor and sensors, said control device provided to receive:
   at least a first sensor signal (V, W, U) representing a position of said rotor with respect to said stator and delivered by a first sensor (16; 18; 14), and
   a second sensor signal representing said position and shifted in phase with respect to said first signal (V; W; U), said second sensor signal being delivered by a second sensor (14; 16; 18);
   said control device comprising:
   combining means (K, R) for combining said first and second sensor signals (U, V, W) in a combined signal ($K_u$; $K_v$; $K_w$), said combining means comprising at least one switching element ($K_0$, $K_1$, $K_2$, $K_3$) controlled with a variable duty cycle ratio, said at least one switching element receiving at least one of said first and second sensor signals for passing therethrough;
   said combined signal ($K_u$; $K_v$; $K_w$) being a function of said duty cycle ratio and provided to control said machine.

2. The control device (30) according to claim 1, further comprising a low-pass filter (38; 38'; 38") provided to filter said combined signal ($K_u$; $K_v$; $K_w$).

3. The control device (30) according to claim 2, wherein the low-pass filter (38; 38'; 38") has a cutoff frequency lower than the transmission frequency of said switching element ($K_0$, $K_1$, $K_2$, $K_3$).

4. The control device (30) according to claim 3, wherein said cutoff frequency is between 1 kHz and 100 kHz.

5. The control device (30) according to claim 1, wherein said combining means (K, R) further comprise means ($R_1$, $R_2$, $R_3$) of weighting said sensor signals.

6. The control device according to claim 5, wherein the weighting means ($R_1$, $R_2$, $R_3$) comprise at least one resistor ($R_1$, $R_2$, $R_3$) intended to receive as an input said sensor signals (U, V, W).

7. The control device according to claim 1, wherein said combining means (K, R) comprise first and second switching elements intended to receive said sensor signals (U, V, W).

8. The control device according to claim 1, wherein said combining means (K, R) for combining are able to combine a third sensor signal (W) with the first and second sensor signals (U, V).

9. The control device according to claim 1, wherein said switching element is a simple switch.

10. The control device according to claim 1, wherein said switching element is a two-position switch.

11. The control device according to claim 1, wherein said control device is adapted to receive as an input a number of said sensor signals (U, V, W) equal to the number of phases of the machine.

12. The control device according to claim 1, wherein said control device cooperates with a control circuit (20) for a power bridge, said control circuit is located downstream of said control device and provided to receive said sensor signals (U, V, W) from said control device.

13. The control device according to claim 1, wherein said control device cooperates with a control circuit (20) of a power bridge, said control circuit provided to receive a filtered combined signal (U', V', W') generated by said control device.

14. The control device according to claim 1, wherein said control device cooperates with a control circuit (20) located downstream of said control device and comprising a microprocessor (34) able to control the duty cycle ratio ($\alpha$) of said switching element ($K_0$, $K_1$, $K_2$, $K_3$).

15. The control device according to claim 14, wherein said microprocessor (34) is able to determine the duty cycle ratio ($\alpha$) according to information representing the rotation speed of said machine.

16. A polyphase rotary electrical machine, comprising a control device according to claim 1.

17. An alternator starter, comprising a control device according to claim 1.

18. A control device for controlling a polyphase rotary electrical machine; said machine comprising a stator, a rotor and sensors; said control device provided to receive:
- at least a first sensor signal (V, W, U) representing a position of said rotor with respect to said stator and delivered by a first sensor (16; 18; 14), and
- a second sensor signal representing said position and shifted in phase with respect to said first signal (V; W; U), said second signal being delivered by a second sensor (14; 16; 18);

said control device comprising:
combining means (K, R) for combining said first and second sensor signals (U, V, W) in a combined signal ($K_u$; $K_v$; $K_w$), said combining means comprising at least one switching element ($K_0$, $K_1$, $K_2$, $K_3$) controlled with a variable duty cycle ratio;

said combined signal ($K_u$; $K_v$; $K_w$) being a function of said duty cycle ratio and provided to control said machine;

said combining means (K, R) comprising first and second switching elements intended to receive said sensor signals (U, V, W);

said first switching element intended to switch opposite to said second switching element.

19. A control device for controlling a polyphase rotary electrical machine; said machine comprising a stator, a rotor and sensors; said control device provided to receive:
- at least a first sensor signal (V, W, U) representing a position of said rotor with respect to said stator and delivered by a first sensor (16; 18; 14), and
- a second sensor signal representing said position and shifted in phase with respect to said first signal (V; W; U), said second signal being delivered by a second sensor (14; 16; 18);

said control device comprising:
combining means (K, R) for combining said first and second sensor signals (U, V, W) in a combined signal ($K_u$; $K_v$; $K_w$), said combining means comprising at least one switching element ($K_0$, $K_1$, $K_2$; $K_3$) controlled with a variable duty cycle ratio;

said combined signal ($K_u$; $K_v$; $K_w$) being a function of said duty cycle ratio and provided to control said machine;

said combining means (K, R) comprising first and second switching elements ($K_1$, $K_0$) intended to receive said sensor signals (U, V, W);

said first switching element intended to be controlled by means of a first duty cycle ratio and said second switching element intended to be controlled by means of a second duty cycle ratio.

* * * * *